US006671415B1

United States Patent
Lei (10) Patent No.: US 6,671,415 B1
(45) Date of Patent: Dec. 30, 2003

(54) METHOD AND APPARATUS FOR QUANTIZING AND DEQUANTIZING DATA

(75) Inventor: Ye Lei, Carlton (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/484,100

(22) Filed: Jan. 14, 2000

(30) Foreign Application Priority Data

Jan. 14, 1999 (AU) .............................. 11328/99

(51) Int. Cl.[7] .................................. G06K 9/36
(52) U.S. Cl. ........................ 382/251; 382/239
(58) Field of Search ............................. 382/251, 239, 382/240, 237, 270; 375/240.03

(56) References Cited

U.S. PATENT DOCUMENTS 5,056,154 A * 10/1991 Aono et al. ................. 382/251
6,141,446 A * 10/2000 Boliek et al. ............... 382/251
6,404,933 B1 * 6/2002 Yamamoto .................. 382/251

* cited by examiner

*Primary Examiner*—Phuoc Tran
(74) *Attorney, Agent, or Firm*—Kenneth A. Haas (57) ABSTRACT

A method and apparatus for quantising data in a data compression system (1) involves receiving original data (2) in the form of a plurality of discrete data values. A plurality of quantisation techniques (11, 14) including bitplane and uniform quantisation techniques are provided in the data compression system (1), at least one of which is selected for quantising the received data. The received data is quantised using one or more of the selected techniques, for example, firstly using the bitplane technique and then using the uniform quantisation technique on the results of the bitplane to produce quantised data, which is then output (6).

5 Claims, 8 Drawing Sheets

FIG.11

METHOD AND APPARATUS FOR QUANTIZING AND DEQUANTIZING DATA

FIELD OF THE INVENTION

This invention relates to a method and apparatus for quantising and dequantising data, especially, although not exclusively, images that are compressed, for example, using a wavelet transform.

BACKGROUND OF THE INVENTION

In a typical transform-based image compression system, an input image is first decomposed by a transform to provide transform coefficient data, which data is then quantised and then coded for onward transmission. One transform used in such a system is the wavelet transform. The transmitted data is then dequantised and reconstructed into the original image.

The most popularly used quantisers in image compression systems work in one of two ways. A first type of quantiser is the uniform quantiser which achieves quantisation using step sizes to quantise the image data in either integer or floating point form. The second type is a bit plane quantiser, which uses thresholds to correlate each bit of the image data to become either "1" or "0". Currently, the two different types of quantisation systems cannot work with each other. That is, a uniform quantiser can only operate with its corresponding uniform dequantiser and a bit plane quantiser can only work with its corresponding bit plane dequantiser. Thus, a decompression system having a particular type of dequantiser cannot decompress data from any compression system, but only from one having the corresponding type of quantiser. Similarly, the coder, which codes the quantised data for onward transmission must be of the correct type to work with the particular type of quantiser.

BRIEF SUMMARY OF THE INVENTION

The present invention therefore seeks to provide a method and apparatus for quantising and dequantising data which overcomes, or at least reduces the above-mentioned problems of the prior art.

Accordingly, in a first aspect, the invention provides a method of quantising data in a data compression system, the method comprising the steps of:

(a) receiving original data in the form of a plurality of discrete data values;

(b) providing a plurality of quantisation techniques in the data compression system;

(c) selecting at least one of the plurality of quantisation techniques for quantising the received data;

(d) quantising the received data using the selected quantisation technique to produce quantised data; and (e) outputting the quantised data.

Preferably, the plurality of quantisation techniques includes at least a first quantisation technique and a second quantisation technique.

In a preferred embodiment step (d) comprises using the first quantisation technique to produce first quantised data and using the second quantisation technique to produce second quantised data from the first quantised data.

Preferably the first quantisation technique comprises a bitplane quantisation technique, which most preferably comprises the steps of:

(d1) determining a current bit plane corresponding to the received original data by quantising each of the discrete data values for a current quantisation level according to whether the discrete data value is above or below a current predetermined threshold to provide a plurality of current quantised values corresponding to the plurality of discrete data values;

(d2) determining the polarity of any quantised value in the bit plane which has become 1 for the first time;

(d3) updating the discrete data values utilising the current predetermined threshold to produce a plurality of updated discrete data values;

(d4) updating the predetermined threshold according to a predetermined rule;

(d5) repeating steps (d1) to (d4) for the updated discrete data values for subsequent levels of quantisation; and (d6) terminating the repetition step (d5) when quantisation for a required number of quantisation levels has been carried out.

Preferably, the second quantisation technique comprises a uniform quantisation technique, which most preferably comprises the step of:

(d7) determining a current integer plane corresponding to the current bit plane determined in step (d1), the current integer plane being formed of a plurality of current integer values, each of which is generated from the corresponding current quantised value and its polarity for the current and any previous quantisation levels;

wherein the second quantised data is formed by the current integer plane and information including the current level of quantisation.

In a preferred embodiment, the information including the current level of quantisation comprises a most recently updated predetermined threshold.

Preferably, the method further comprises a first step of receiving input data and level shifting the received input data to provide the discrete data values.

According to a second aspect, the invention provides apparatus for quantising data in a data compression system, the apparatus comprising:

an input for receiving original data in the form of a plurality of original discrete data values;

a first quantisation module coupled to the input for quantising the discrete data values using a first quantisation technique to produce first quantised data at an output thereof;

a second quantisation module selectively coupled to the input for quantising the discrete data values using a second quantisation technique to produce second quantised data at an output thereof;

a selector coupled to the outputs of the first and second quantisation modules for selecting at least one of the first and second quantised data at an output thereof.

According to a third aspect, the invention provides apparatus for quantising data in a data compression system, the apparatus comprising:

an input to receive original data in the form of a plurality of original discrete data values;

a first quantisation module coupled to the input and having an output to provide first quantised data;

a second quantisation module selectively coupled to the input and having an output to provide second quantised data;

a selector having inputs coupled to the outputs of the first and second quantisation modules and having an output.

In a preferred embodiment, the second quantisation module is selectively coupled to the output of the first quantisation module. The first quantisation module preferably comprises a bitplane quantisation module. The second quantisation module preferably comprises a uniform quantisation module.

In a fourth aspect, the invention provides a method of dequantising quantised data in a data decompression system, the method comprising the steps of:

(a) receiving quantised data;

(b) providing a plurality of dequantisation techniques in the data decompression system;

(c) selecting at least one of the plurality of dequantising techniques for dequantising the received quantised data;

(d) dequantising the received quantised data using the selected dequantising technique to produce dequantised data; and (e) outputting the dequantised data.

In a preferred embodiment, the plurality of dequantisation techniques includes at least a first dequantisation technique and a second dequantisation technique.

The first dequantisation technique preferably comprises a bitplane dequantisation technique. The second dequantisation technique preferably comprises a uniform dequantisation technique.

Preferably, step (d) comprises using a quantisation technique to produce further quantised data and using the second dequantisation technique to produce dequantised data from the further quantised data.

Preferably, the quantised data has been quantised using a bitplane technique, the quantisation technique is a uniform quantisation technique and the second dequantisation technique comprises a uniform dequantisation technique.

The quantisation technique preferably comprises the step of:

determining current integer values corresponding to bitplane values received as the quantised data, a current integer value being generated from the corresponding current bitplane value and its polarity for the current and any previous quantisation levels;

wherein the further quantised data is formed by the current integer values.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
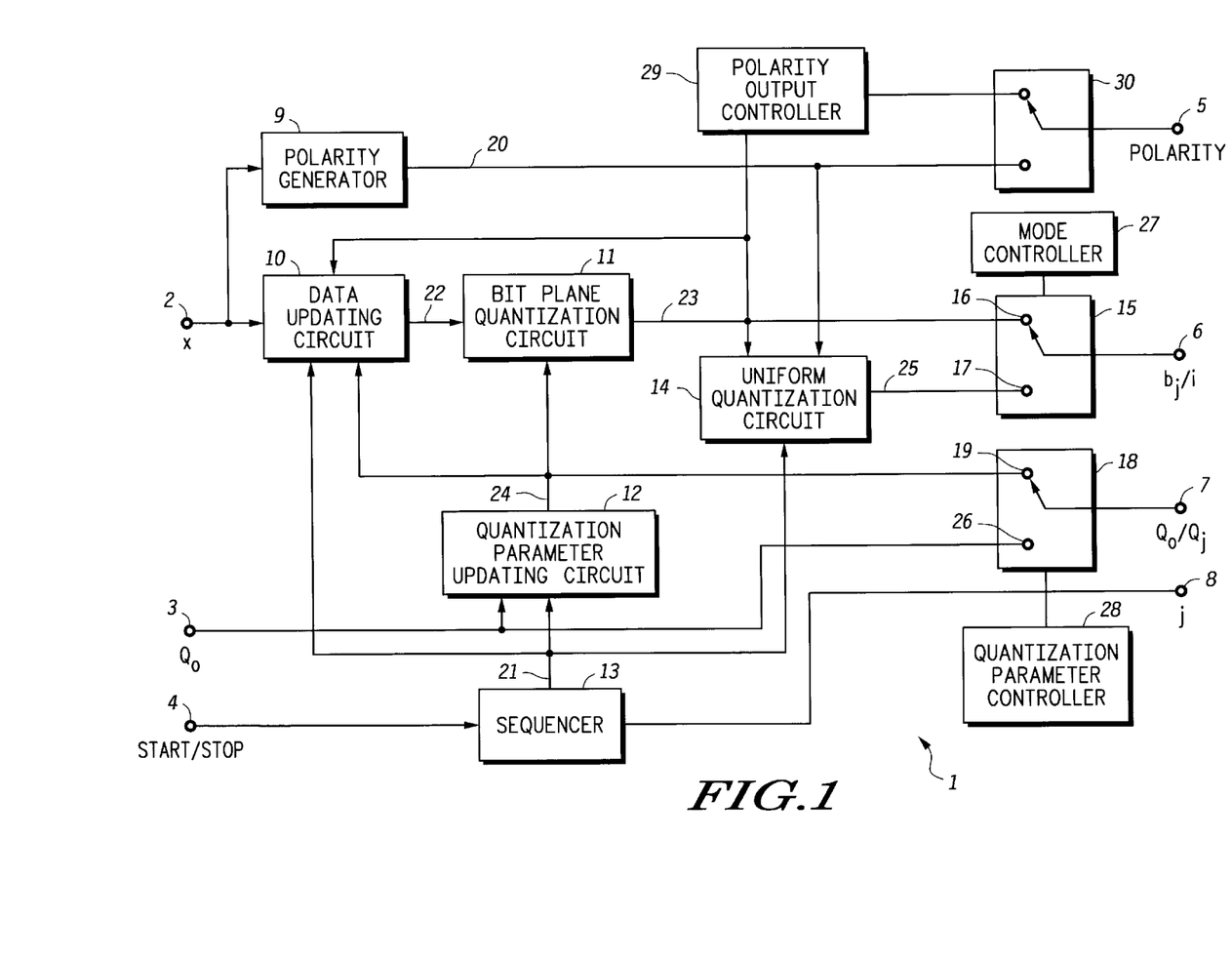
FIG. 1 shows a block diagram of apparatus for quantising data according to a preferred embodiment of the present invention.

Thus, as shown in FIG. 1, a quantiser 1 according to one embodiment of the invention receives input data x at a data input 2. A quantisation parameter $Q_0$ is received at a second input 3 and a third input 4 receives a START/STOP control signal to control the quantisation operation. The quantiser 1 can produce either bitplane quantisation data $b_j$ or uniform (integer) quantisation data i at a data output terminal 6 together with polarity data associated with the output data, as will be more fully described below, at polarity output 5. Quantisation parameters $Q_0$, $Q_j$ and value j that are required at a dequantiser to dequantise the data are provided at outputs 7 and 8, respectively.

As shown in FIG. 1, the data input 2 is coupled to a polarity generator 9 and to a data updating circuit 10. The second input 3 is coupled to a quantisation parameter updating circuit 12 and the third input 4 is coupled to a sequencer 13, whose output 21 is coupled to the quantisation parameter updating circuit 12, to the data updating circuit 10 and to a uniform quantisation circuit 14. An output 20 of the polarity generator 9 is coupled to the uniform quantisation circuit 14 and to polarity output 5. An output 22 of the data updating circuit 10 is coupled to a bitplane quantisation circuit 11, whose output 23 is coupled to the uniform quantisation circuit 14 and back to the data updating circuit 10. An output 24 of the quantisation parameter updating circuit 12 is coupled to the data updating circuit 10 and to the bitplane quantisation circuit 11.

A mode switching circuit 15 is provided with a pair of input terminals 16 and 17 and an output terminal coupled to output 6. Input terminal 16 is coupled to output 23 of the bitplane quantisation circuit 11 and input terminal 17 is coupled to an output 25 of the uniform quantisation circuit 14. A second switching circuit 18 is provided with a pair of input terminals 19 and 26 and an output terminal coupled to output 7. Input terminal 19 of the second switching circuit 18 is coupled to the output 24 of the quantisation parameter updating circuit 12 and input terminal 26 is coupled to the second input 3 of the quantiser 1. The mode switching circuit 15 is controlled by a mode controller 27, which determines whether bitplane quantisation data $b_j$ or uniform quantisation data i is required and switches the output of the mode switching circuit 15 to either input terminal 16 or input terminal 17 accordingly. Similarly, the second switching circuit 18 is controlled by a quantisation parameter controller 28, which determines whether quantisation parameter $Q_0$ or quantisation threshold $Q_j$ is required as the output and switches the output of the second switching circuit 18 to either input terminal 19 or input terminal 26 accordingly.

The quantiser 1 is enabled by a START control signal applied at input 4, being received by sequencer 13, which initializes the sequencer 13 so that j=0. An enable signal providing the value of j at the output 21 of the sequencer 13 is received by the quantisation parameter updating circuit 12, the data updating circuit 10, and the uniform quantisation circuit 14 to enable them. When the data updating circuit 10 is enabled, the input data x is received from input 2 by the data updating circuit 10 and by the polarity generator 9, which generates the polarity data provided to polarity output 5. The polarity data is a binary symbol that represents the polarity of the input data x. The symbol "+" represents a zero or positive polarity of input data x while the symbol "−" represents a negative polarity of the input data x.

The data updating circuit 10 calculates an intermediate data value $x_j$ for the input data x according to the value of j received from the sequencer 13, as will be more fully described below. This intermediate data value $x_j$ is passed to the bitplane quantisation circuit 11. When the quantisation parameter updating circuit 12 receives the enable signal from the sequencer 13, it takes the quantisation parameter $Q_0$ from input 3 and calculates a quantisation threshold $Q_j$ from quantisation parameter $Q_0$ and the value of j, as will be more fully described below. This quantisation threshold $Q_j$ is passed to the bitplane quantisation circuit 11 which calculates the bitplane quantisation data $b_j$ from the intermediate data value $x_j$ and the quantisation threshold $Q_j$, as will be more fully described below.

The enable signal from the sequencer 13 is also passed to the uniform quantisation circuit 14, which receives the output data $b_j$ from the output 23 of bitplane quantisation circuit 11 and the polarity data from the output 20 of polarity generator 9 and calculates a value of a uniform quantisation integer i, as will be more fully described below.

As mentioned above, the mode controller 27 determines the mode in which the quantiser operates and quantisation parameter controller 28 determines whether the quantisation parameter $Q_0$ or quantisation threshold $Q_j$ is provided at output 7. Whether bitplane quantisation data $b_j$ or the uniform quantisation integer i, is to be provided at output 6, depends on the design and capabilities of the corresponding dequantiser. Similarly, whether the quantisation parameter $Q_0$ or quantisation threshold $Q_j$ is provided at output 7 also depends on the design and capabilities of the corresponding dequantiser.

Assuming now, that the output 6 of the quantiser is to provide the bitplane quantisation data $b_j$, the mode controller 27 controls the mode switching circuit 15 to be connected as shown in FIG. 1. The operation of the quantiser then follows the steps shown in the flow chart 49 of FIG. 2. The operation starts at box 31 and proceeds when the START control signal at input 4 initializes the sequencer 13 so that j=0, as shown in box 32. The polarity generator 9 then receives (box 33) the input data x and generates the polarity data, as indicated at box 34. The quantisation parameter controller 28 then determines whether quantisation parameter $Q_0$ or quantisation threshold $Q_j$ is required as the output, as shown in box 35 in FIG. 2. If quantisation parameter $Q_0$ is required, second switching circuit 18 is switched so that the output is connected to input terminal 26 so that quantisation parameter $Q_0$ is provided at the output 8, as indicated by box 36 in FIG. 2.

Quantisation parameter updating circuit 12 then takes the value of j from the output 21 of the sequencer 13 and the value of the quantisation parameter $Q_0$ from input 3 and calculates the quantisation threshold $Q_j$ as follows $Q_j = Q_0/2^j$ as indicated by box 37 in FIG. 2.

Figure 2:
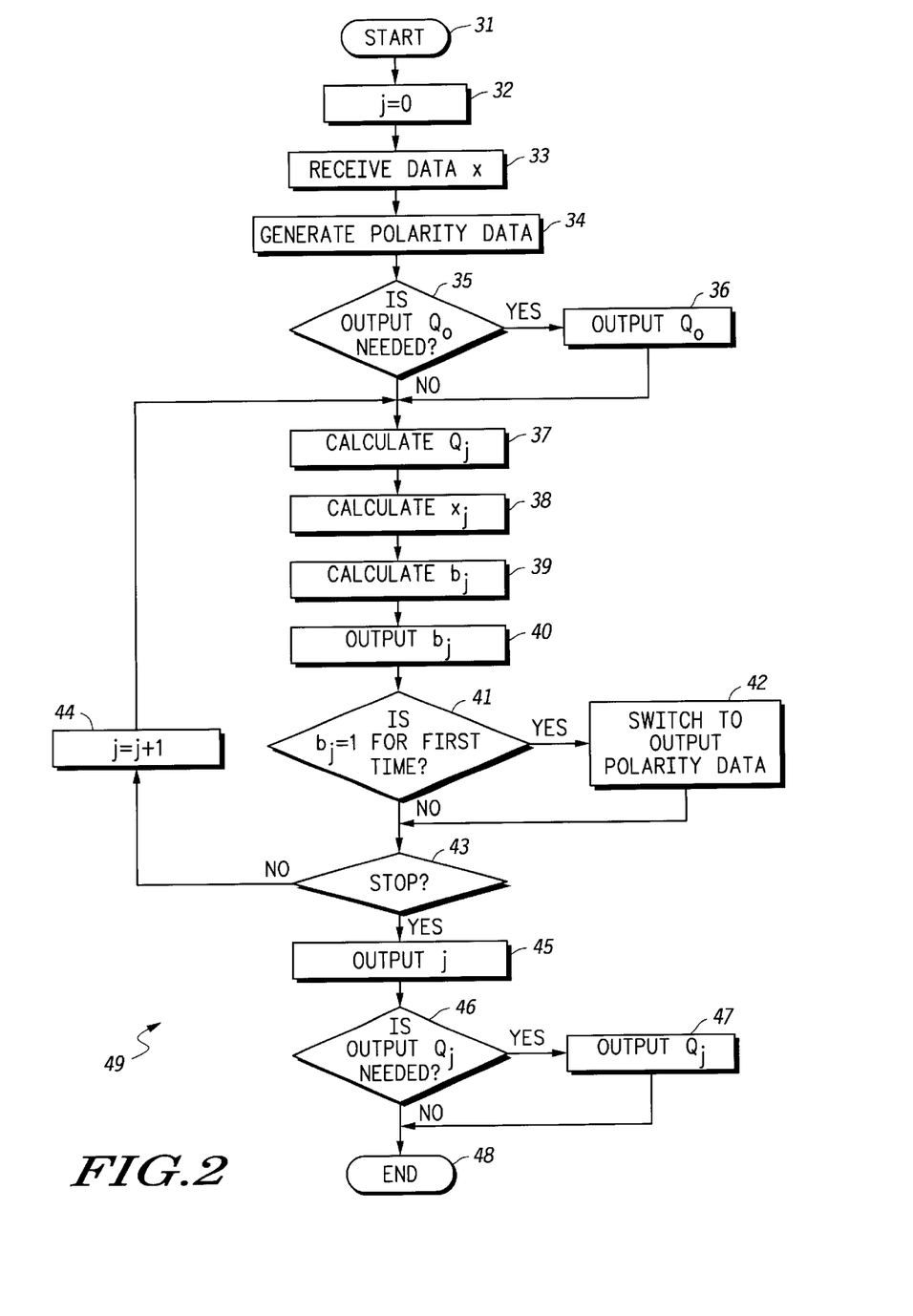
FIG. 2 shows a flow chart of a first method of operation of the apparatus of FIG. 1.

The data updating circuit 10 then calculates an intermediate data value $x_j$ for the input data x according to the value of j received from the sequencer 13, as shown by box 38 in FIG. 2. The operation of calculating the intermediate data is shown in more detail in the flowchart shown in FIG. 3. The operation proceeds from the start 50 to determine whether the value of j provided from the output 21 of the sequencer 13 is zero, as indicated by box 51. If j=0 then the intermediate data value $x_0$ for the input data x is taken to be the absolute magnitude |x| of the input data x, as shown by box 52, and the operation is then complete, as indicated by box 53.

Figure 3:
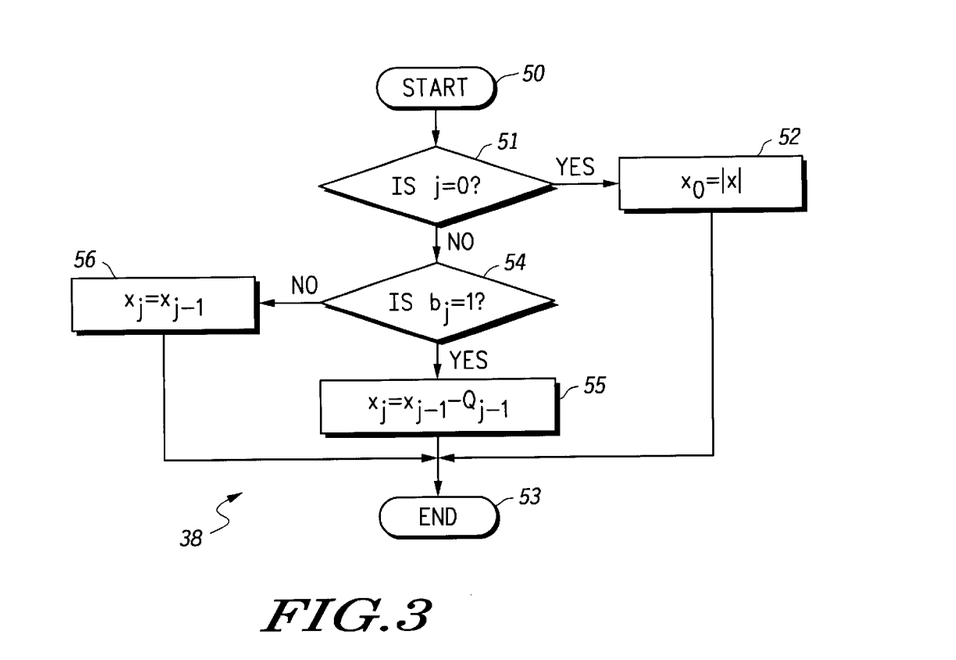
FIGS. 3 and 4 show more detailed flow charts of two of the steps of the flow chart of FIG. 2.

If the value of j≠0, then the data updating circuit 10 determines the value of the bitplane quantisation data $b_j$ from the output 23 of data generating circuit 11, as shown by box 54 of FIG. 3. If the previous bitplane quantisation data $b_j=1$, then the value of the intermediate data is calculated, as shown by box 55 in FIG. 3, by $x_j=x_{j-1}-Q_{j-1}$ and the operation ends 53. Otherwise, if the previous bitplane quantisation data $b_j=0$, then, as indicated by box 56, the intermediate data value $x_j=x_{j-1}$ and the operation ends 53.

Figure 4:
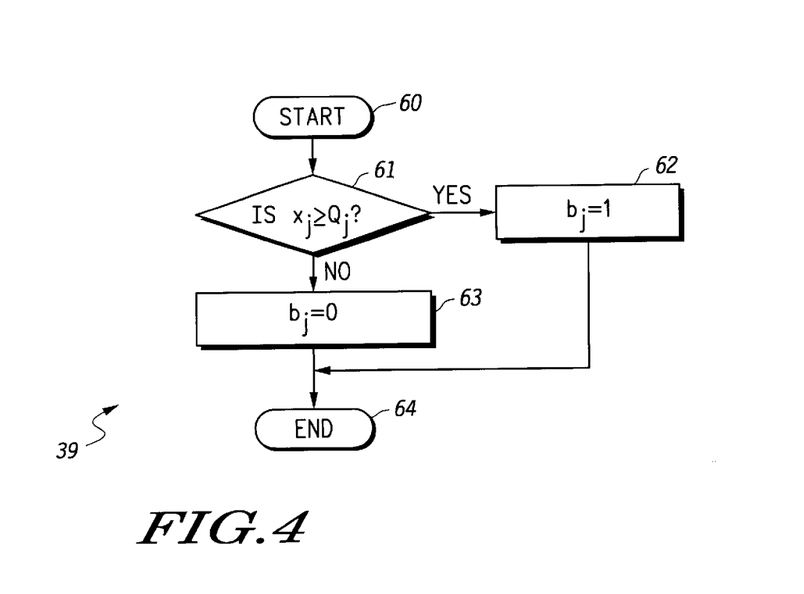

Once the intermediate data value $x_j$ has been calculated, it is passed at the output 22 of the data updating circuit 10 to the bitplane quantisation circuit 11 to calculate the bitplane quantisation data $b_j$ from the intermediate data value $x_j$ and the quantisation threshold $Q_j$, as indicated by box 39 in FIG. 2. The bitplane quantisation data $b_j$ is a bit that can take one of two values denoted as "1" and "0", respectively. FIG. 4 shows the flowchart of the operation of box 39 in more detail.

As can be seen in FIG. 4, operation 39 commences at the start 60 and then determines whether the intermediate data value $x_j$ is greater than or equal to the quantisation threshold $Q_j$, as shown by box 61 in FIG. 4. If it is, then the bitplane quantisation data $b_j$ is denoted as "1", as indicated by box 62, and if the intermediate data value $x_j$ is less than the quantisation threshold $Q_j$, then the bitplane quantisation data $b_j$ is denoted as "0", as indicated by box 63 and the operation 32 then ends at box 64. The bitplane quantisation data $b_j$ is then provided via the output 23 of bitplane quantisation circuit 11 and the mode switching circuit 15 to the output 5, as indicated by box 40 in FIG. 2.

The operation then proceeds at box 41 to determine whether the bitplane quantisation data $b_j$ has been denoted with a value "1" for the first time. This is carried out by the polarity output controller 29 which takes the output 23 from the bitplane quantisation circuit 11 and controls a polarity output switching circuit 30 to receive the polarity data from the output 20 of the polarity generator 9 if the bitplane quantisation data $b_j$ has become "1" for the first time, as indicated by box 42 in FIG. 2. If it has not received the STOP control signal, then the sequencer 13 increments j to j+1, as indicated by box 44 and the process returns to box 37 in the flow. If the sequencer 13 has not received the STOP control signal, then, as indicated by box 45, the sequencer 13 provides the current value of j to output 8. If the quantisation parameter controller 28 has determined, as indicated at box 46, that quantisation threshold $Q_j$ is required at output 7, second switching circuit 18 is switched so that the output is connected to input terminal 19 which receives the output 24 from the quantisation parameter updating circuit 12, so that $Q_j$ is provided at output 7, as indicated at box 47 in FIG. 2. The process then stops, as indicated by box 48.

Figure 5:
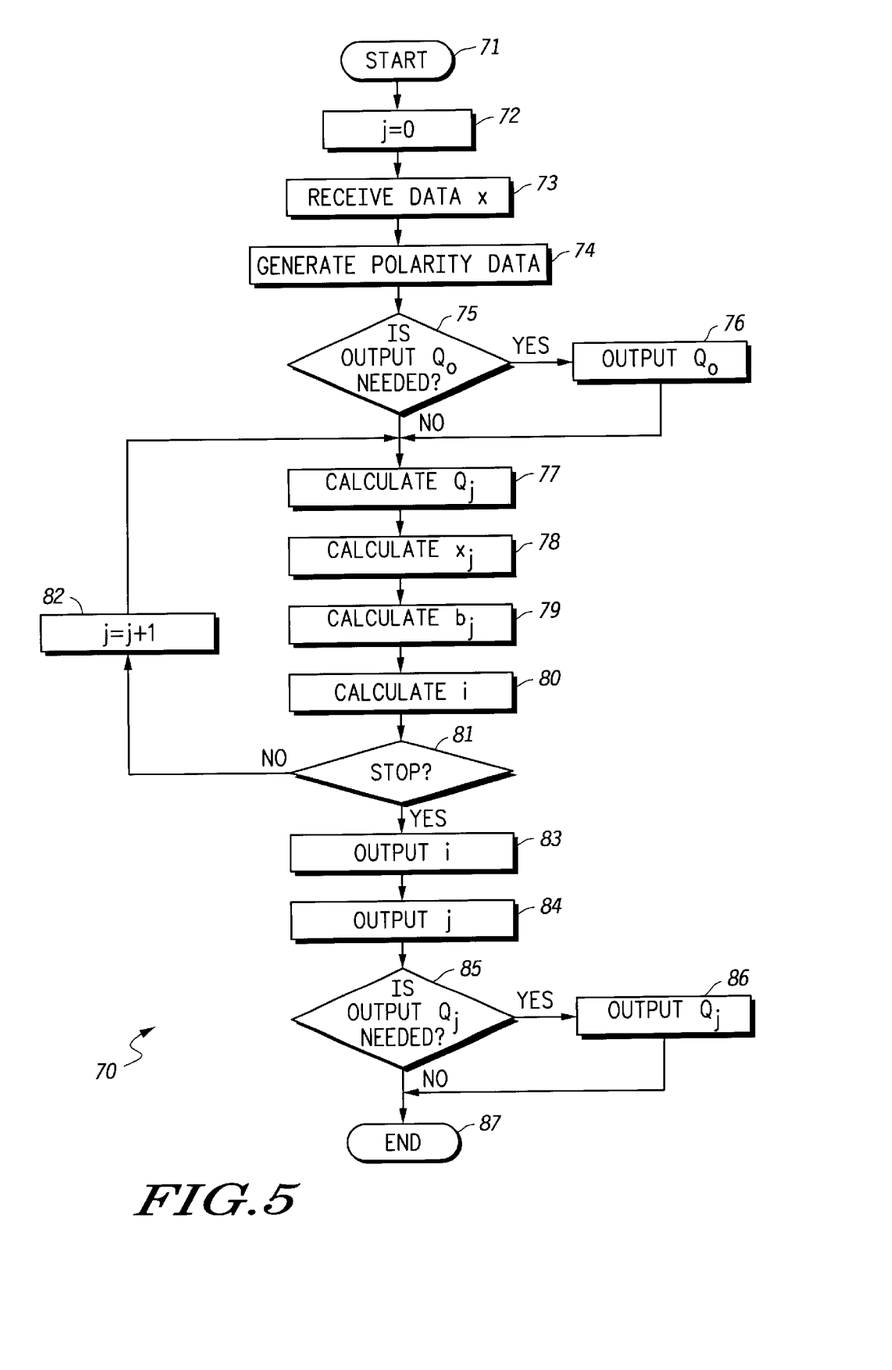
FIG. 5 shows a flow chart of a second method of operation of the apparatus of FIG. 1.

FIG. 5 shows a flowchart 70 indicating the operation of the quantiser 1 when the mode controller 27 determines that the output 6 of the quantiser is to provide the uniform quantisation data i. This process flow is generally the same as the process flow of FIG. 2 through to the calculation of the bitplane quantisation data $b_j$ at box 3 (7 in FIG. 5). Thus, this process flow begins at the start 71 and proceeds when the START control signal at input 4 initializes the sequencer 13 so that j=0, as shown in box 72. The polarity generator 9 then receives (box 73) the input data x and generates the polarity data, as indicated at box 74. The quantisation parameter controller 28 then determines whether quantisation parameter $Q_0$ or quantisation threshold $Q_j$ is required as the output, as shown in box 75. If quantisation parameter $Q_0$ is required, second switching circuit 18 is switched so that the output is connected to input terminal 26 so that quantisation parameter $Q_0$ is provided at the output 8, as indicated by box 76 in FIG. 5.

Quantisation parameter updating circuit 12 then takes the value of j from the output 21 of the sequencer 13 and the value of the quantisation parameter $Q_0$ from input 3 and calculates the quantisation threshold $Q_j$, in the same way as before, as indicated by box 77. The data updating circuit 10 then calculates an intermediate data value $x_j$ for the input data x according to the value of j received from the sequencer 13, as shown by box 78.

Figure 6:
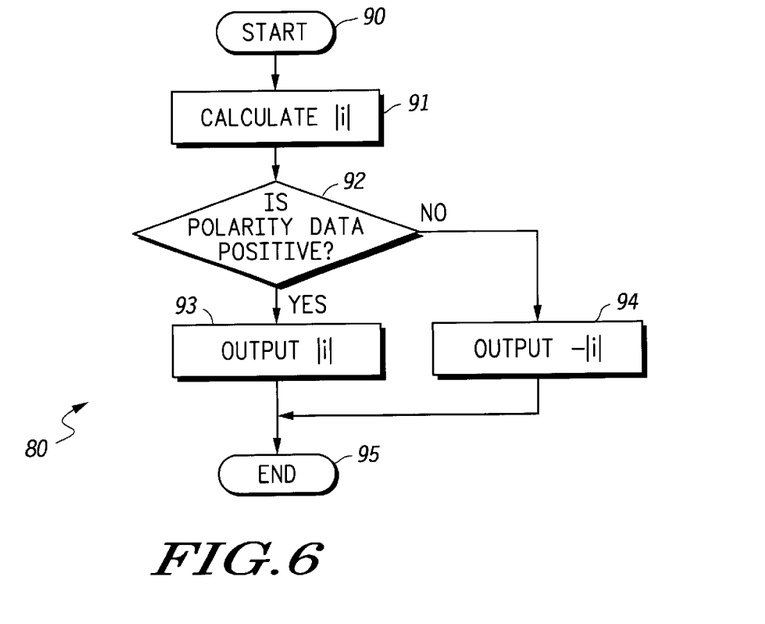
FIG. 6 shows a more detailed flow chart of one of the steps of the flow chart of FIG. 5.

Once the intermediate data value $x_j$ has been calculated, it is passed at the output 22 of the data updating circuit 10 to the bitplane quantisation circuit 11 to calculate the bitplane quantisation data $b_j$ from the intermediate data value $x_j$ and the quantisation threshold $Q_j$, as indicated by box 9. The next step 80 is the calculation of the uniform quantisation data i by the uniform quantisation circuit 14. The uniform quantisation circuit 14 received the bitplane quantisation data $b_j$ from the output 23 of the bitplane quantisation circuit 11, the value of j from the output 21 of the sequencer 13 and the polarity data from the output 20 of the polarity data generator 9. FIG.6 shows the flowchart of the operation of box 80 in more detail.

As can be seen in FIG. 6, operation 80 commences at the start 90 and then calculates the magnitude $|i|$ as follows:

$$|i| = \sum_{l=0}^{j} 2^{j-l} \cdot b_l$$

as indicated by box 91. Next, the polarity data is checked, as shown by box 92. If the polarity is positive, then a positive integer i equal to $|i|$ is provided to output 25 of the uniform quantisation circuit 14, as indicated by box 93. If the polarity is negative, then a negative integer i equal to $-|i|$ is provided to output 25 of the uniform quantisation circuit 14, as indicated by box 94. The operation then stops, as indicated by box 95.

Figure 10:
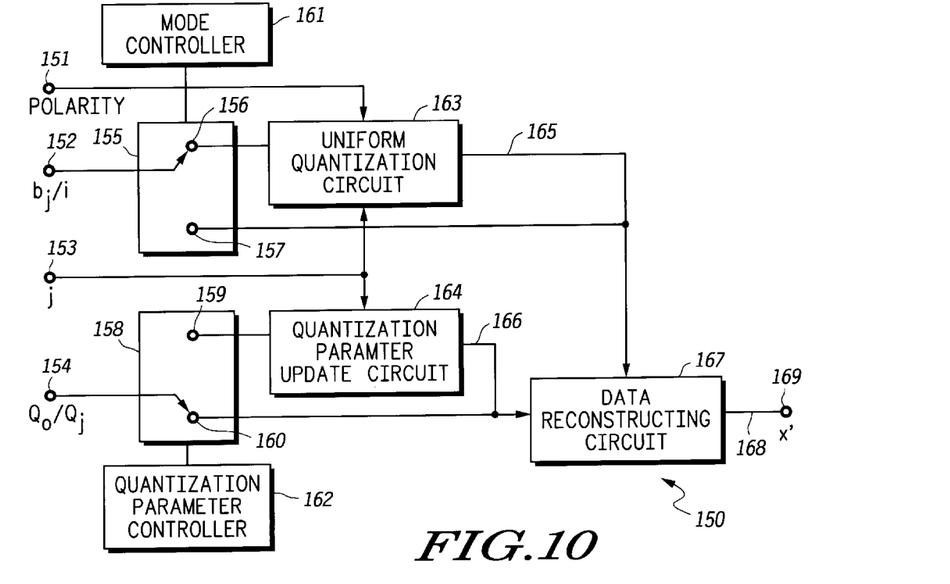
FIG. 10 shows a block diagram of a non-progressive dequantiser according to an embodiment of the present invention.

Thus, the quantiser 1 can operate to provide either bitplane quantisation data or uniform (integer) quantisation data, according to the mode controller 27. The mode controller determines which quantisation data is to be output according to the type of dequantiser to be used to reconstruct the data from the quantised data. There are two types of dequantisers that can reconstruct the data quantised by the quantiser 1 illustrated in FIG. 1. Firstly, a progressive dequantiser of the type shown in FIG. 7, and secondly, a non-progressive dequantiser, as shown in FIG. 10.

Figure 7:
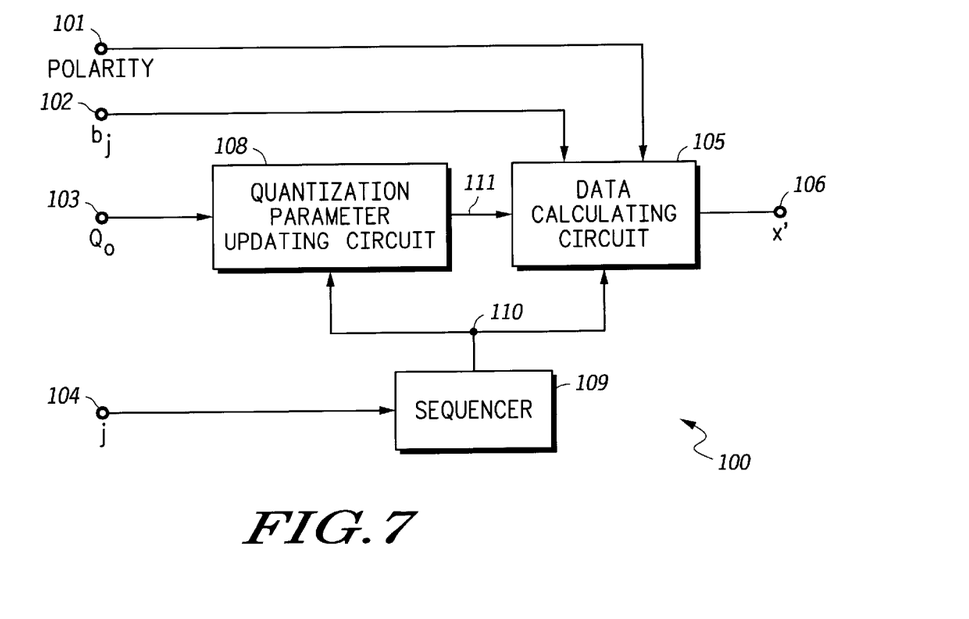
FIG. 7 shows a block diagram of a progressive dequantiser according to an embodiment of the present invention.

As shown in FIG. 7, a progressive dequantiser 100 comprises a polarity input 101 for receiving polarity data, such as that provided at the polarity output 5 of quantiser 1, bitplane quantisation data input 102 for receiving bitplane quantisation data $b_j$ such as that provided at output 6 of quantiser 1 when the mode switching circuit 15 is connected with the output connected to the input terminal 16, quantisation parameter input 103 for receiving quantisation parameter $Q_0$, such as that provided at output 7 of quantiser 1 when second switching circuit 18 is switched so that the output is connected to input terminal 26, and j input 104 for receiving the value of j, such as provided at output 8 of quantiser 1. The polarity input 101 and the bitplane quantisation data input 102 are coupled to an output data calculating circuit 105, whose output 106 provides the reconstructed data x'. Quantisation parameter input 103 is coupled to a quantisation parameter updating circuit 108 and the j input 104 is coupled to a sequencer 109, whose output 110 is coupled to the quantisation parameter updating circuit 108 and to the output data calculating circuit 105.

Figure 8:
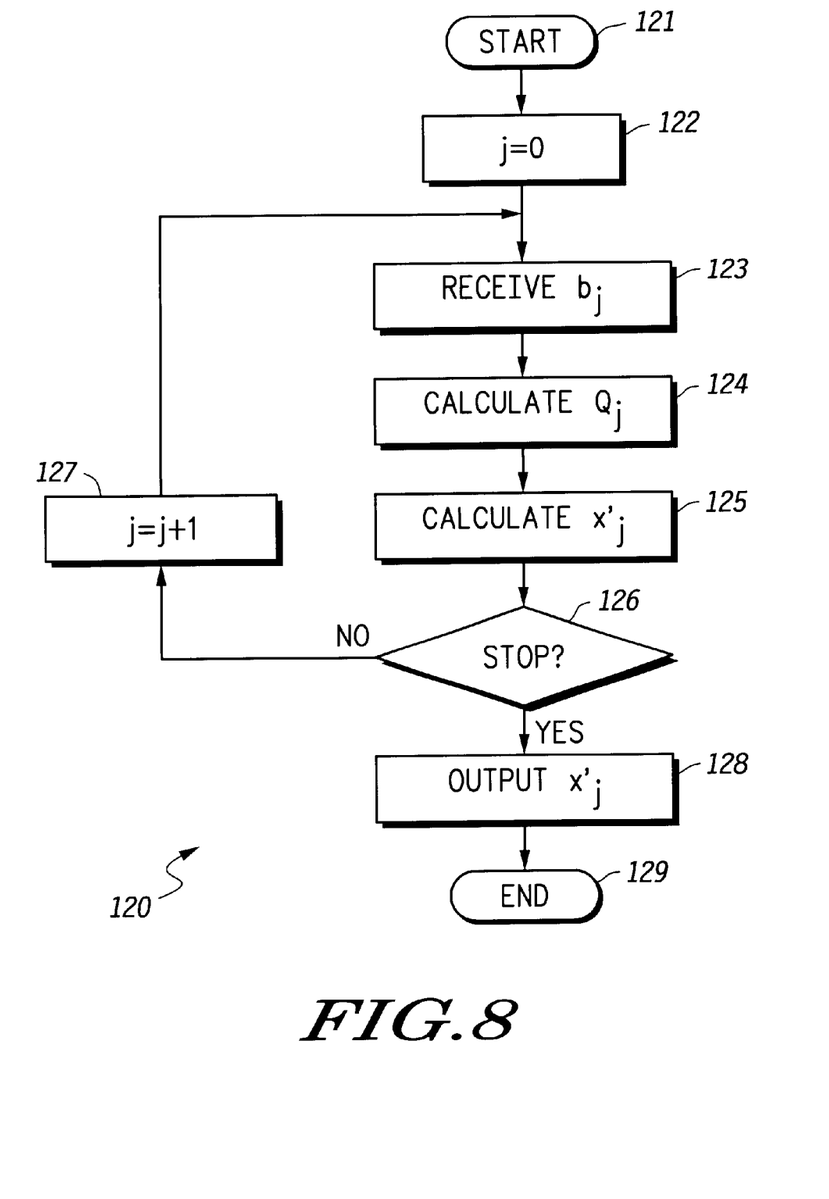
FIG. 8 shows a flow chart of a method of operation of the dequantiser of FIG. 7.

Referring now additionally to FIG. 8, which illustrates the operation 120 of the progressive dequantiser 100 of FIG. 7, the process commences at the start 121 and then proceeds by initialising the sequencer 109 so that j=0. The value of j is provided at the output 110 of sequencer 109 and is passed to the output data calculating circuit 105, which also receives the bitplane quantisation data $b_j$ from the bitplane quantisation data input 102, as indicated by box 123 in FIG. 8. The value of j is also received by the quantisation parameter updating circuit 108, which also receives the quantisation parameter $Q_0$ from the quantisation parameter input 103. The quantisation parameter updating circuit 108 calculates the quantisation threshold $Q_j$ in the same way as the quantisation parameter updating circuit 12 of quantiser 1, as follows:

$$Q_j = Q_0/2^j$$

indicated by box 124 of FIG. 8.

Figure 9:
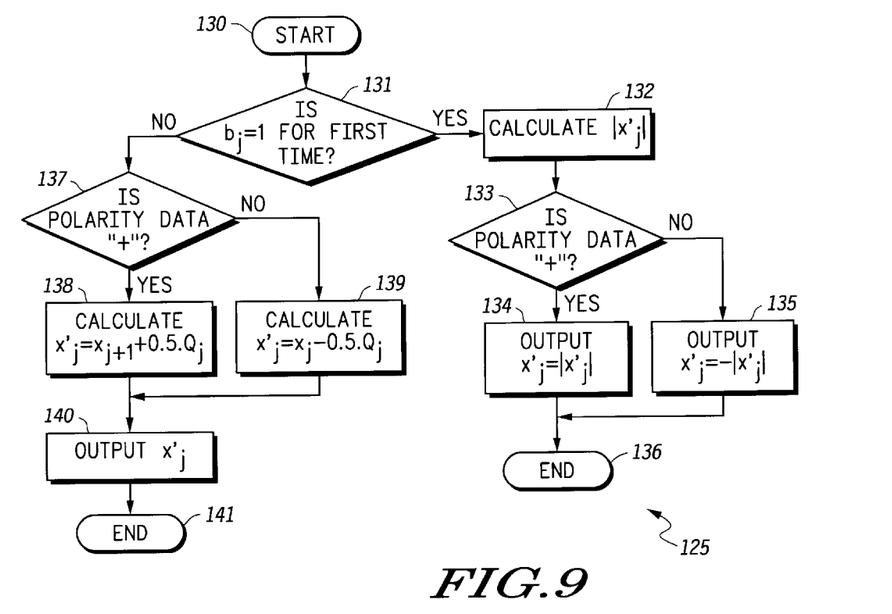
FIG. 9 shows a more detailed flow chart of one of the steps of the flow chart of FIG. 8.

The quantisation threshold $Q_j$ calculated by the quantisation parameter updating circuit 108 is provided at its output 111 and passed to the output data calculating circuit 105, which then calculates intermediate reconstructed data $x_j'$, as indicated by box 125 in FIG. 8. The process of box 125 is shown in more detail in FIG. 9, where the process 125 starts at box 130 and proceeds to determine (at box 131) whether the bitplane quantisation data $b_j$ has been denoted with a value "1", or positive, for the first time. If it has, then the magnitude of the intermediate reconstructed data $x_j'$ is calculated, as indicated by box 132, as follows:

$$|x_j'| = 1.5 \cdot Q_j$$

The polarity data received from polarity input 101 for the bitplane quantisation data $b_j$ is then checked (box 133) and if the polarity data is positive, then the intermediate reconstructed data $x_j'$ is provided as $|x_j'|$, as indicated by box 134. Otherwise, if the polarity data is negative, the intermediate reconstructed data $x_j'$ is provided as $-|x_j'|$, as indicated by box 135. This part of the process flow then ends at box 136.

Returning now to box 131, if the bitplane quantisation data $b_j$ has not been denoted with a value "1" for the first time, then the polarity data is checked, as indicated by box 137. If the polarity data is positive, then the intermediate reconstructed data $x_j'$ is calculated as follows:

$$x_j' = x_{j-1}' + 0.5 \cdot Q_j$$

as indicated by box 138 in FIG. 9. If the polarity data is negative, then the intermediate reconstructed data $x_j'$ is calculated as follows:

$$x_j' = x_j' - 0.5 \cdot Q_j$$

as indicated by box 139 in FIG. 9. The calculated value of the intermediate reconstructed data $x_j'$ is then output, as indicated by box 140 and this part of the process flow ends at box 141.

Returning now to the process flow of FIG. 8, when the intermediate reconstructed data $x_j'$ is calculated (box 125), the sequencer 109, the checks (box 126) whether the current value of j is equal to the value of j received from the j input 104, indicating that the process is to stop. If it isn't, then the sequencer increments j=j+1, as indicated by box 127 in FIG. 8. If it is, then the intermediate reconstructed data $x_j'$ is provided as the output reconstructed data $x_j$, as indicated by box 128 and the process ends (box 129).

Turning now to FIG. 10, there is shown a non-progressive dequantiser 150, which reconstructs data $x_j'$ from the quantised data $b_j|i$ from the quantisation parameter/threshold $Q_{0|Qj}$ 118, the polarity data 15 and the value j. The non-progressive dequantiser 150 has four input terminals 151, 152, 153 and 154, corresponding generally to the four outputs 5, 6, 7 and 8 of quantiser 1. Thus, polarity input terminal 151 receives polarity data, such as that provided at the polarity output 5 of quantiser 1, input terminal 152 receives either bitplane quantisation data $b_j$ or uniform quantisation data i such as that provided at output 6 of quantiser 1, j input terminal 153 receives the value of j, such as provided at output 8 of quantiser 1, and input terminal 154 receives either the quantisation parameter $Q_0$, or the quantisation threshold $Q_j$, such as that provided at output 7 of quantiser 1.

Input terminal 152 is coupled to an input of a mode switching element 155 having a pair of output terminals 156 and 157. A second switching element 158 is provided with a pair of output terminals 159 and 160 and an input coupled to input terminal 154. The mode switching element 155 is controlled by a mode controller 161, which determines whether bitplane quantisation data $b_j$ or uniform quantisation data i is to be received and switches the input of the mode switching element 155 to either output terminal 156 or output terminal 157 accordingly. Similarly, the second switching element 158 is controlled by a quantisation parameter controller 162, which determines whether quantisation parameter $Q_0$ or quantisation threshold $Q_j$ is to be received at the input terminal 154 and switches the input of the second switching element 158 to either output terminal 159 or output terminal 160 accordingly.

Output terminal 156 of the mode switching element 155 is coupled to a uniform quantisation circuit 163, which is similar to uniform quantisation circuit 14 of quantiser 1. The uniform quantisation circuit 163 is also coupled to polarity input terminal 151 and to j input terminal 153. Output terminal 159 of the second switching element 158 is coupled to a quantisation parameter updating circuit 164, similar to quantisation parameter updating circuit 12 of quantiser 1.

An output 165 of the uniform quantisation circuit 163 is coupled, together with output terminal 157 of the mode switching element 155 to a data reconstructing circuit 167. Similarly, an output 166 of the quantisation parameter updating circuit 164 is coupled, together with output terminal 160 of the second switching element 158 to the data reconstructing circuit 167, which has an output 168 coupled to an output terminal 169 of the non-progressive dequantiser 150.

It will thus be apparent that the data reconstructing circuit 167 receives two inputs. One input is the quantisation threshold $Q_j$, which is either provided at input terminal 154 from the quantiser or, if the input terminal 154 receives the quantisation parameter $Q_0$, is calculated by quantisation parameter updating circuit 164. The other input to the data reconstructing circuit 167 is the uniform quantisation data i, which is either provided at input terminal 152 from the quantiser or, if the input terminal 152 receives the bitplane quantisation data $b_j$, is calculated by the uniform quantisation circuit 163.

Figure 11:
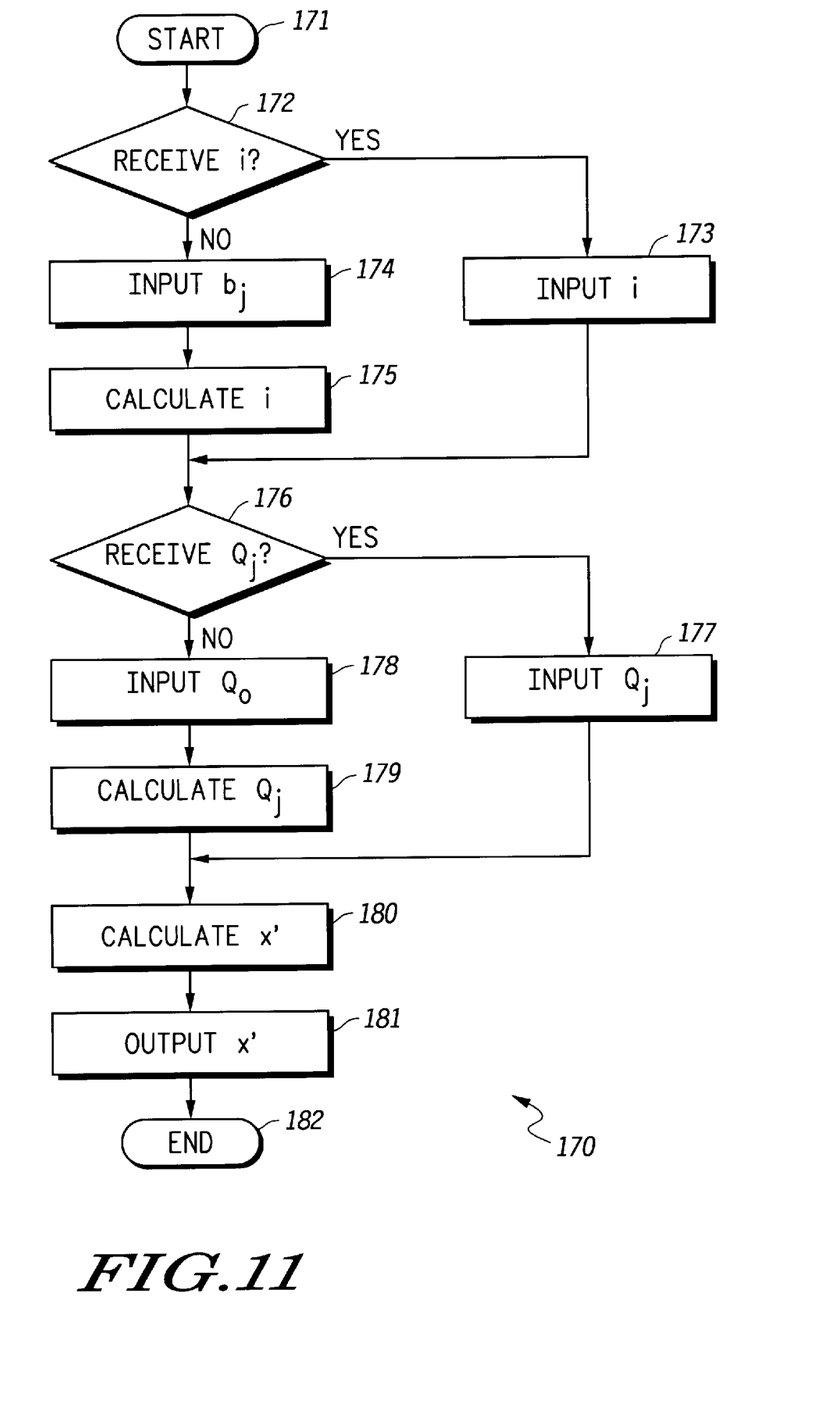
FIG. 11 shows a flow chart of a method of operation of the dequantiser of FIG. 10.

A flowchart 170 showing the operation of the non-progressive dequantiser 150 is depicted in FIG. 11. As shown in flowchart 170, the operation of the non-progressive dequantiser 150 commences at the start 171 and then proceeds to determine (box 172) whether the input terminal 152 is to receive bitplane quantisation data $b_j$ or uniform quantisation data i. If uniform quantisation data i is to be received, then mode controller 161 switches the mode switching element 155 so that the input terminal 152 is coupled to output terminal 157 so that uniform quantisation data i is input to the data reconstructing circuit 167, as indicated by box 173. If bitplane quantisation data $b_j$ is to be received, then mode controller 161 switches the mode switching element 155 so that the input terminal 152 is coupled to output terminal 156 so that the bitplane quantisation data $b_j$ is input to the uniform quantisation circuit 163, as indicated by box 174. The uniform quantisation circuit 163 then proceeds to calculate the uniform quantisation data i from the bitplane quantisation data $b_j$, the polarity data provided at polarity input terminal 151, and the value of j provided at the j input terminal 153, as indicated by box 175 of FIG. 11. In order to calculate the uniform quantisation data i, the uniform quantisation circuit 163 requires successive values of the bitplane quantisation data denoted as $b_0, b_1, b_2, \ldots, b_j$, depending on the value of j received from the j input terminal 153. Similarly to the uniform quantisation circuit 14 of quantiser 1, the uniform quantisation circuit 163 calculates the magnitude of uniform quantisation data i as follows:

$$|i| = \sum_{l=0}^{j} 2^{j-l} \cdot b_l$$

As described above with reference to the uniform quantisation circuit 14 of quantiser 1, the polarity is then checked. If the polarity is positive, then a positive integer i equal to $|i|$ is provided to output 165 of the uniform quantisation circuit 163. If the polarity is negative, then a negative integer i equal to $-|i|$ is provided to output 165.

The next stage is to determine (box 176) whether the input terminal 154 is to receive the quantisation parameter $Q_0$ or the quantisation threshold $Q_j$. If the quantisation threshold $Q_j$ is to be received, then mode controller 162 switches the second switching element 158 so that the input terminal 154 is coupled to output terminal 160 so that the quantisation threshold $Q_j$ is input to the data reconstructing circuit 167, as indicated by box 177. If the quantisation parameter $Q_0$ is to be received, then mode controller 162 switches the second switching element 158 so that the input terminal 154 is coupled to output terminal 159 so that the quantisation parameter $Q_0$ is input to the quantisation parameter updating circuit 164, as indicated by box 178. The quantisation parameter updating circuit 164 then proceeds to calculate the quantisation threshold $Q_j$ from the quantisation parameter $Q_0$ and the value of j provided at the j input terminal 153, as indicated by box 179 of FIG. 11. Similarly to the quantisation parameter updating circuit 12 of quantiser 1, the quantisation parameter updating circuit 164 calculates the quantisation threshold $Q_j$ as follows:

$$Q_j = Q_0/2^j.$$

The data reconstructing circuit 167 thus receives the quantisation threshold $Q_j$ and the uniform quantisation data i proceeds to calculate the value of the reconstructed data x', as indicated by box 180 in FIG. 11. The reconstructed data is calculated as follows:
  i) If the uniform quantisation data i is zero, the reconstructed data x' is also zero;
  ii) If the uniform quantisation data i is positive, the reconstructed data x' is calculated as $x'=(i-0.5) \cdot Q_j$;
  iii) If the uniform quantisation data i is negative, the reconstructed data x' is calculated as $x'=(i-0.5) \cdot Q_j$.

The reconstructed data x' is then output (box 181) to the output terminal 169, and the process flow stops 182.

It will be appreciated that although only one particular embodiment of the invention has been described in detail, various modifications and improvements can be made by a person skilled in the art without departing from the scope of the present invention.

What is claimed is:

1. A method of quantising data in a data compression system, the method comprising the steps of:
   (a) receiving original data in the form of a plurality of discrete data values;
   (b) providing a plurality of quantisation techniques in the data compression system;
   (c) selecting at least one of the plurality of quantisation techniques for quantising the received data, the plurality of quantisation techniques including at least a first bit plane quantisation technique and a second quantisation technique;
   (d) quantising the received data using the bit plane quantisation technique to produce first quantised data and using the second quantisation technique to produce second quantised data from the first quantised data, wherein the bitplane quantisation technique comprises the sub-step of:
      (d1) determining a current bit plane corresponding to the received original data by quantising each of the discrete data values for a current quanation level according to whether the discrete data value is above or below a current predetermined threshold to provide a plurality of current quantised values corresponding to the plurality of discrete data values;
      (d2) determining the polarity of any quantised value in the bit plane which has become "1" for the first time;
      (d3) updating the discrete data values utilising the current predetermined threshold to produce a plurality of updated discrete data values;
      (d4) updating the predetermined threshold according to a predetermined rule;
      (d5) repeating steps (d1) to (d4) for the updated discrete data values for subsequent levels of quantisation; and
      (d6) terminating the repetition step (d5) when quantisation for a required number of quantisation levels has been carried out; and
   (e) outputting the quantised data.

2. A method of quantising data according to claim 1, wherein the second quantisation technique comprises a uniform quantisation technique.

3. A method of quantising data according to claim 2, wherein the uniform quantisation technique comprises the step of:
   (d7) determining a current integer plane corresponding to the current bit plane determined in step (d1), the current integer plane being formed of a plurality of current integer values, each of which is generated from the corresponding current quantised value and its polarity for the current and any previous quantisation levels;
      wherein the second quantised data is formed by the current integer plane and information including the current level of quantisation.

4. A method of quantising data according to claim 3, wherein the information including the current level of quantisation comprises a most recently updated predetermined threshold.

5. A method of quantising data according to claim 1, further comprising a first step of receiving input data and level shifting the received input data to provide the discrete data values.

* * * * *